UNITED STATES PATENT OFFICE.

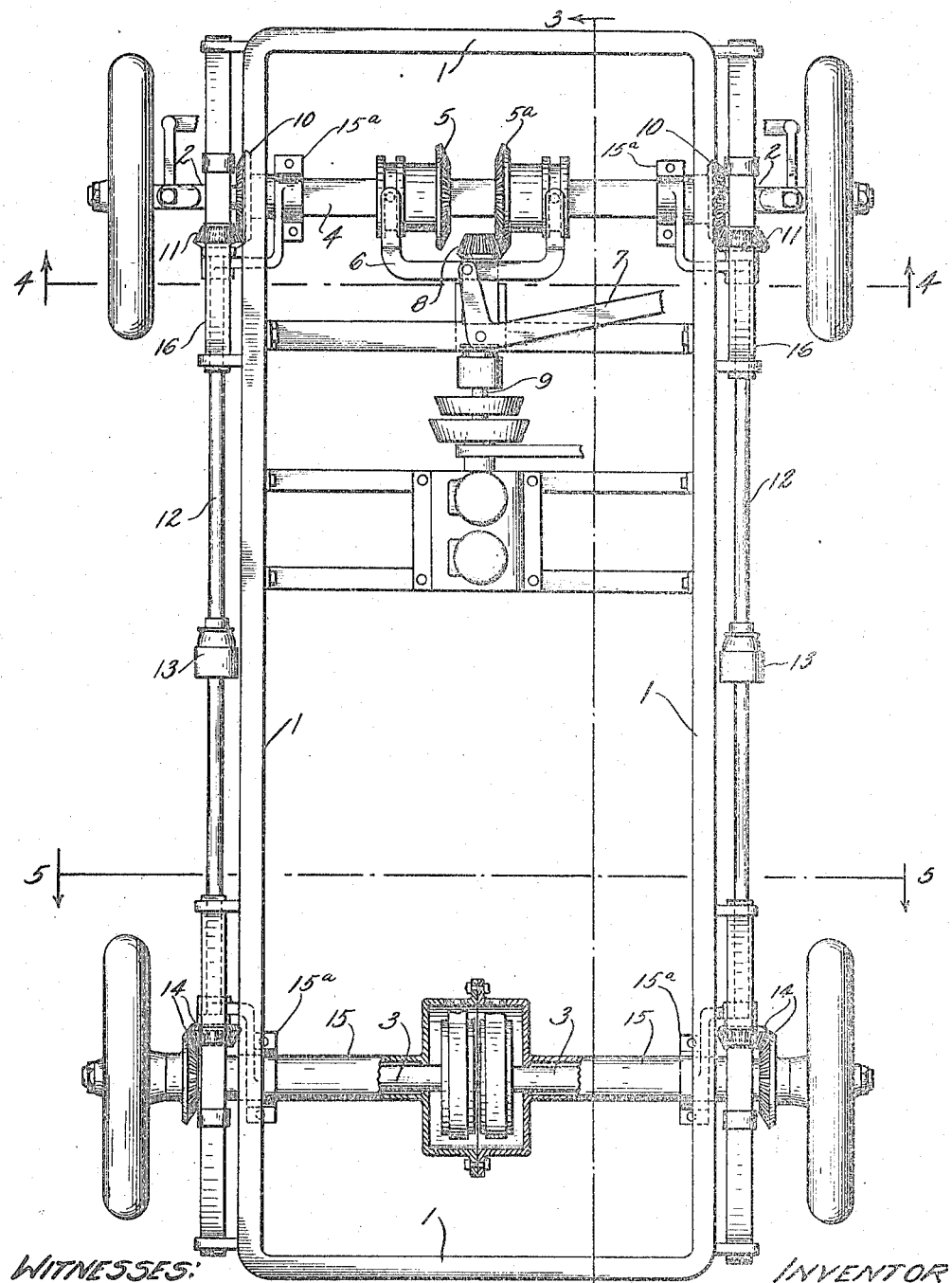

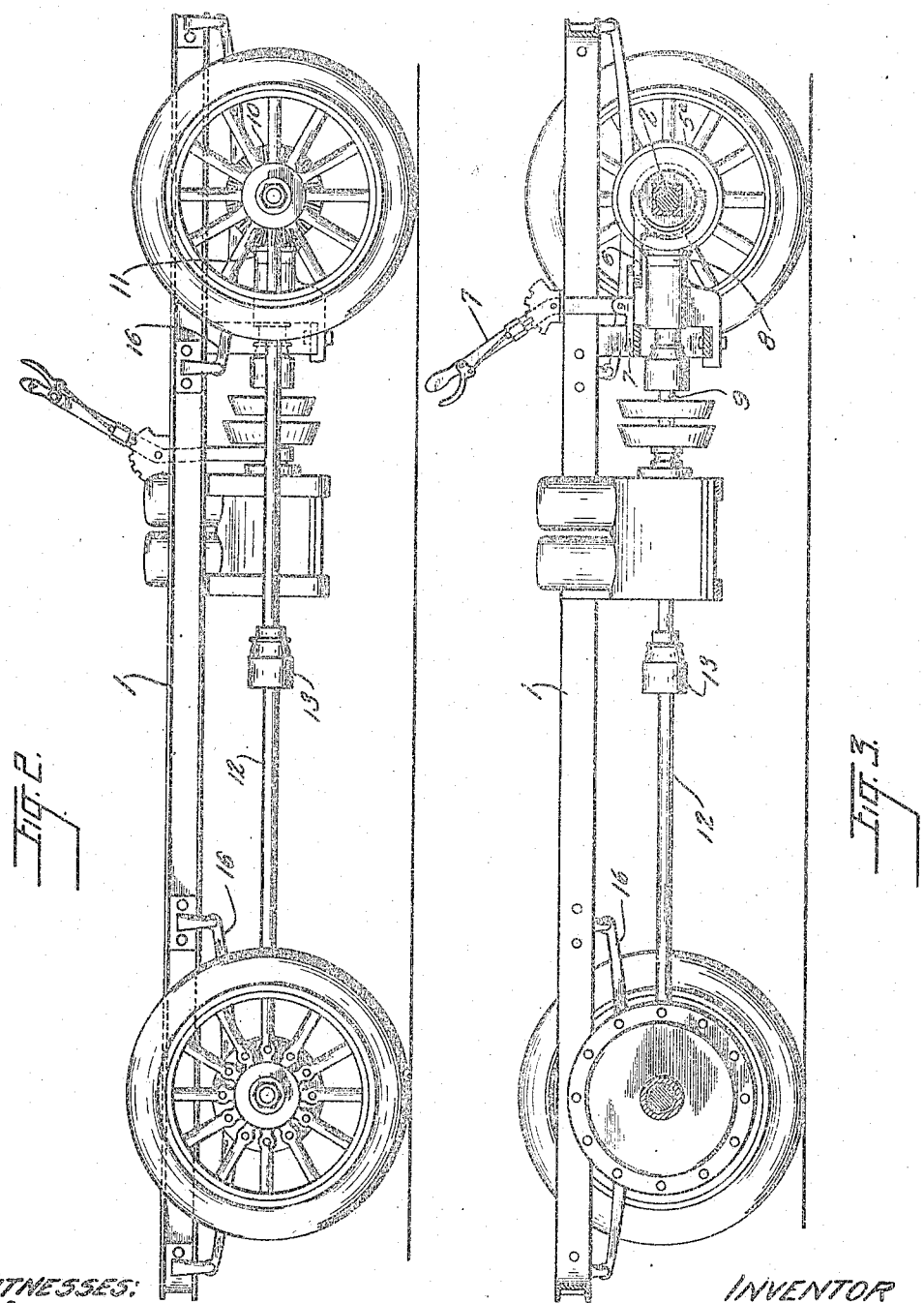

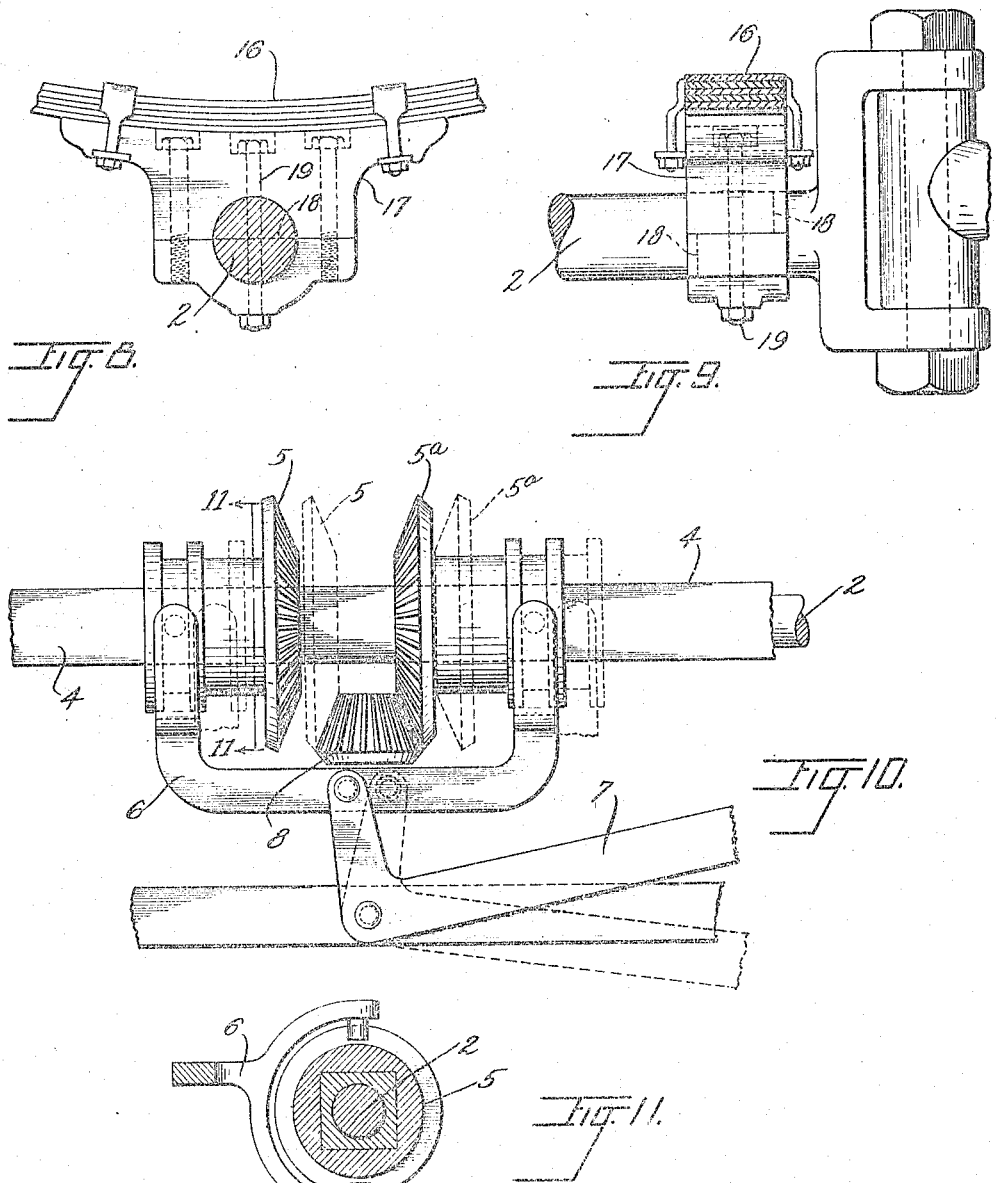

VICTOR ADOLPH STROM, OF HOFFMAN, MINNESOTA.

AUTOMOBILE.

1,131,289.

Specification of Letters Patent.

Patented Mar. 9, 1915.

Application filed May 13, 1914. Serial No. 838,232.

*To all whom it may concern:*

Be it known that I, VICTOR A. STROM, a citizen of the United States, residing at Hoffman, in the county of Grant and State of Minnesota, have invented certain new and useful Improvements in Automobiles, of which the following is a specification.

This invention relates to improvements in automobiles and its object is to produce a machine of this class in which power from the engine is transmitted to gearing disposed upon a sleeve carried upon the front vehicle axle and conveyed therefrom to the rear axle by a pair of rotary transmission shafts. The gearing is so arranged and disposed that it is unnecessary to reverse the engine to reverse the power and the driving power is applied to the driving axle, which is the rear axle, adjacent each of its ends.

With the foregoing and other objects in view the invention consists in the combination and arrangement of parts to be hereinafter fully described in the following specification, pointed out in the claim and illustrated in the accompanying drawings which from a part of said specification and in which—

Figure 4:
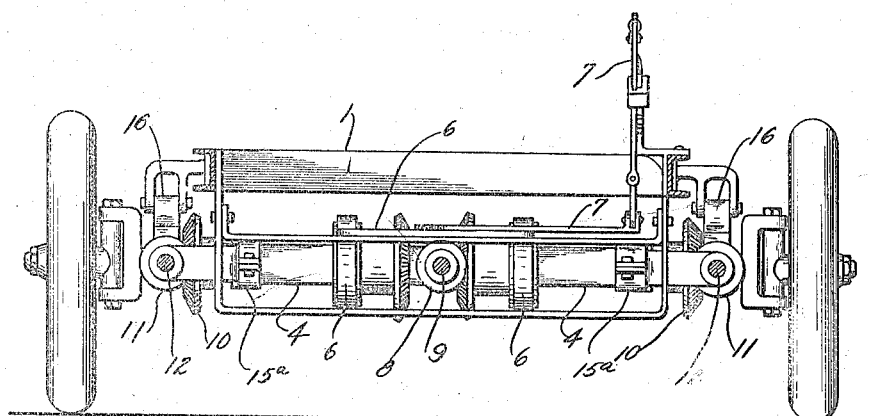
Figure 5:
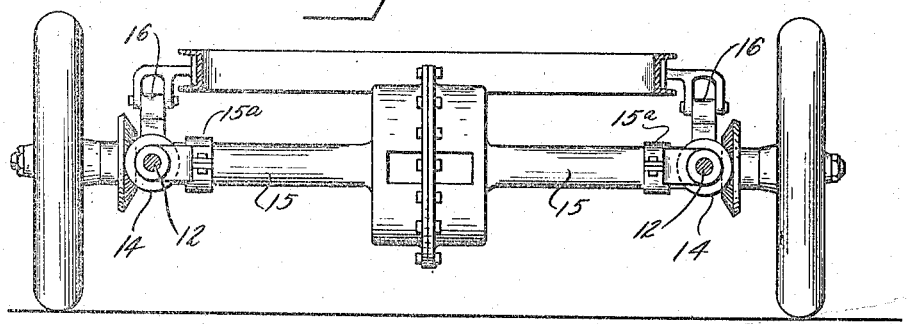
Figures 6, 7:
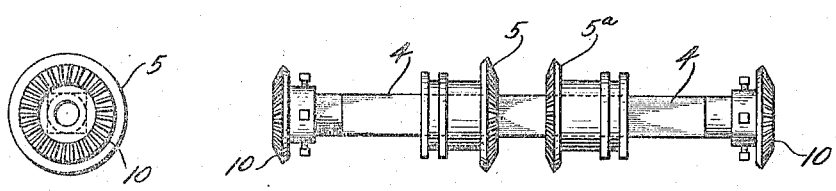

Figure 1 is a plan of the frame of the machine showing my improved construction. Fig. 2 is a side elevation. Fig. 3 is a longitudinal section in side elevation with the power reversed. Fig. 4 is a cross section taken on line 4—4 of Fig. 1. Fig. 5 is a cross section taken on line 5—5 of Fig. 1. Fig. 6 is a view of the sleeve, with its gears, that is disposed upon the front axle. Fig. 7 is an end view of Fig. 6. Fig. 8 is a view of one end of Fig. 9. Fig. 9 is a side view of Fig. 8. Fig. 10 is an enlarged view of the reversing gears and engine shaft. Fig. 11 is a section taken on line 11—11 of Fig. 10.

Like reference characters indicate corresponding parts throughout the several views.

The reference numeral 1 indicates the frame of the machine, 2 the front axle and 3 the rear axle. Upon the front axle a sleeve 4 is loosely disposed to which the sliding gears 5, 5ᵃ are slidably secured which are connected by the yoke 6 that is operable by the lever 7 whereby either gear may be thrown into engagement with the gear 8 of the engine shaft 9 to effect a drive of the sleeve 4 in either of two directions. Each end of the sleeve 4 is provided with a bevel gear 10 which gears are in mesh with the bevel gears 11 of the rotary transmission shafts 12, 12, said shafts being formed of two pieces connected by universal joints 13. The shafts 12, 12, further, are bevel-gear connected as at 14, 14 to rear axle 3, 3 about which sleeve 15 is disposed. The shafts 12, 12 are terminally supported in brackets 15ᵃ carried by the front and rear sleeves.

The construction of the machine is such as to make it necessary to form the front axle of three parts so that the machine may be assembled. The springs 16 are carried upon a split seat 17 which is mounted upon the axle 2 which axle is split at each end as shown at 18 in Fig. 9. To place the spring seat in position the split end of the axle is pulled apart and said seat adjusted, the axle then reassembled and the parts bolted together by a bolt 19.

In operation the engine shaft 9 will drive the sleeve 4 in either direction through the medium of the gears 5, 5ᵃ and said sleeve will drive the transmission shafts 12, 12 which, in turn, will drive the rear axle 3 causing the rear wheels to propel the machine.

What is claimed is:—

In a power propelled vehicle, a frame, a front axle therefor, a rear axle, a sleeve loose upon said front axle, a sleeve disposed about said rear axle, sliding gears secured to said front axle sleeve, manually operable control for said gears, a power shaft capable of engaging either of said gears, and transmission mechanism connecting said front and rear axle sleeves.

In testimony that I claim the foregoing as my own I have hereto affixed my signature in the presence of two subscribing witnesses.

VICTOR ADOLPH STROM.

Witnesses:
 FRANK BUSCHER,
 OLE LENDSTROM.